United States Patent [19]

Kuhl et al.

[11] Patent Number: 5,008,988
[45] Date of Patent: Apr. 23, 1991

[54] CLIP ASSEMBLY

[75] Inventors: Virgil F. Kuhl, Lauderhill; Guenter Noll, Ft. Lauderdale, both of Fla.

[73] Assignee: Motorola, Inc., Schaumburg, Ill.

[21] Appl. No.: 409,857

[22] Filed: Sep. 20, 1989

[51] Int. Cl.[5] .............................................. A44B 21/00
[52] U.S. Cl. ...................................... 24/510; 24/67.7; 24/453
[58] Field of Search ................. 24/510, 697, 320, 453, 24/297, 317, 340, 323, 584, 677, 35; 403/318, 319; 16/229, 386

[56] References Cited

U.S. PATENT DOCUMENTS

| 491,011 | 1/1893 | Dom . | |
|---|---|---|---|
| 702,523 | 6/1902 | Yawman . | |
| 1,175,550 | 3/1916 | Murray . | |
| 2,367,657 | 1/1945 | Boersma | 24/453 |
| 2,500,032 | 3/1950 | Helberg . | |
| 3,897,967 | 8/1975 | Barenyi | 24/297 |
| 4,075,742 | 2/1978 | Remark et al. | 24/453 |
| 4,083,481 | 4/1978 | Selinko . | |
| 4,403,377 | 9/1983 | Mizusawa | 24/297 |
| 4,635,836 | 1/1987 | Mooney et al. . | |
| 4,739,912 | 4/1988 | Klawieter et al. | 24/453 |
| 4,741,074 | 5/1988 | Budano II et al. . | |
| 4,745,662 | 5/1988 | Change | 24/67.7 |
| 4,828,153 | 5/1989 | Guzik et al. . | |

FOREIGN PATENT DOCUMENTS

| 418735 | 2/1967 | Switzerland | 24/297 |
|---|---|---|---|
| 595994 | 12/1947 | United Kingdom | 24/453 |

Primary Examiner—Victor N. Sakran
Attorney, Agent, or Firm—Pablo Meles

[57] ABSTRACT

Briefly, according to the invention, a clip assembly 10 comprises a clip 1 and a bracket 6, each having at least one hole (4, 5, 11, and 12) for alignment with each other. Alignment of the holes is required so that a pin 13 positioned through the holes pivotally secures the bracket 6 to the clip 1. The pin has a head 15 with a diameter that is greater than at least one of the holes. The pin 13 with the head 15 is passed through the holes for retaining the clip assembly 10. In the preferred embodiment, a spring 17 is used for biasing the clip 1 towards the bracket 6.

6 Claims, 1 Drawing Sheet

CLIP ASSEMBLY

TECHNICAL FIELD

This invention relates generally to the field of belt or pocket clips, and more specifically to a self retaining belt clip pin for use in belt or pocket clips.

BACKGROUND

Portable products such as radio transceivers and pagers often provide pocket or belts clip to attach the portable product to clothing worn by the user. Relevant art belt clips are generally designed for manual assembly and now present problems when attempting automated assembly. Relevant art belt clips utilizing pins further present problems in terms of durability.

Manufacturing a typical prior art belt clip requires manual alignment of hinge pin holes of the clip with hinge pin holes of the housing. A known prior art belt clip uses a rolled metal pin which is difficult to align because, prior to insertion, the diameter of the pin is larger than the diameter of the holes. Accordingly, the pin is not self-aligning and insertion resistance is encountered over the entire length of the pin. Furthermore, the interference fit between the rolled metal pin and the hole in a plastic clip causes undue stress and fatigue in the plastic, thereby reducing the durability of the plastic clip. The continual radial forces endured by plastic clips makes the pin and hole juncture the equivalent of an Achilles heel, exposing an otherwise durable product to sudden collapse.

Another typical relevant art pin discussed in U.S. Pat. No. 1,175,550, utilizes a retainer such as a press-on nut. This pin causes increased part count, further factory assembly problems including increased tooling and field problems due to loose or lost attachment hardware.

SUMMARY OF THE INVENTION

Briefly, according to the invention, a clip assembly comprises a clip and a bracket, each having at least one hole for alignment with each other. Alignment of the holes is required so that a pin positioned through the holes pivotally secures the bracket to the clip. The pin has a head with a diameter that is greater than at least one of the holes. The pin with the head is passed through the holes for retaining the clip assembly. In an alternative embodiment, a spring is used for biasing the clip towards the bracket.

DETAILED DESCRIPTION OF THE PREFERRED EMBODIMENT

Figure 1:
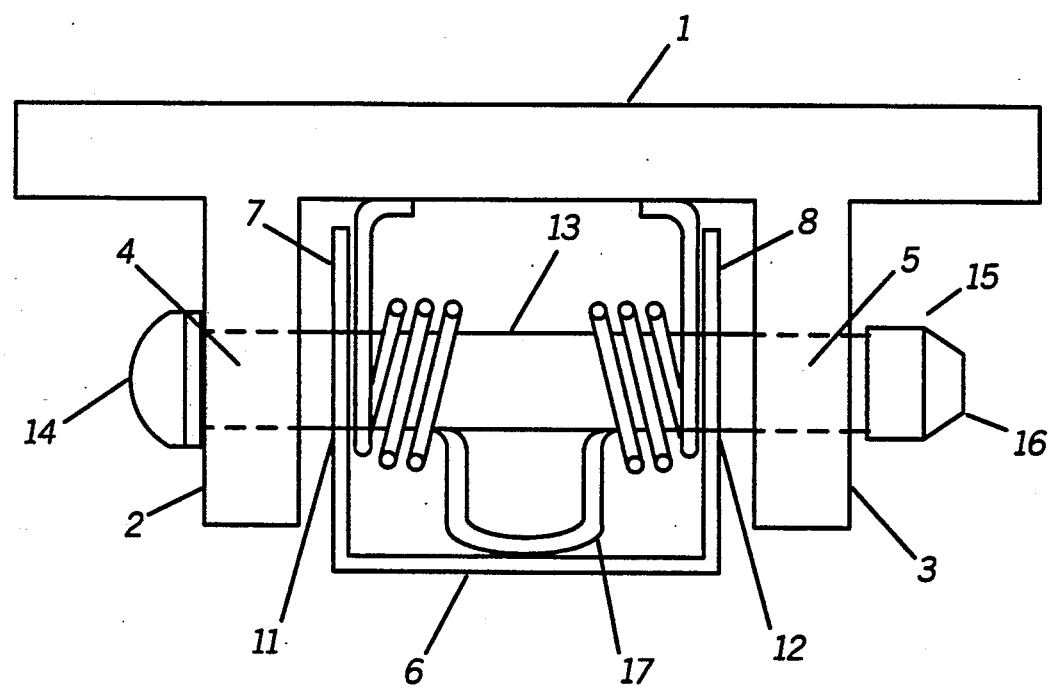
FIG. 1 is a top plan view of a clip assembly 10 in accordance with the present invention.

Referring to FIG. 1, there is shown an clip assembly 10 in accordance with the present invention. The clip assembly 10 comprises a first and second member. The first member, preferably a clip 1, includes arms 2 and 3 each respectively having a hole 4 and 5 therein (preferably with diameters of 70 mils each). The second member, preferably a U-shaped bracket 6, includes arms 7 and 8 each respectively having a hole 11 and 12 therein (preferably with diameters of 76 mils each). The holes 4 and 5 of the clip 1 are axially aligned with the respective holes 11 and 12 of the bracket 6. The clip 1, usually made of a rigid plastic such as polycarbonate, is pivotally secured to the bracket 6 by a pin 13, comprised of a rigid material such as stainless steel or plastic. The pin 13 is desirably arranged and constructed to have a first oversized head 14 and a second head 15 integrally connected to pin 13 (preferably with a diameter of 73 mils ) with a tapered feature 16 that preferabaly tapers to a diameter of 71 mils at the end. The pin 13 (having a shank diamter smaller than the diameter of the holes 4, 5, 11, and 12, preferably a shank diameter of 65 mils ) with its tapered feature 16 and second head 15 passes through the holes 4, 5, 11, and 12.

In constructing the clip assembly 10, the tapered feature 16 and second head 15 is pressed through the holes 4 and 5 progressively, causing the holes 4 and 5 to momentarily expand while the tapered feature 16 and second head 15 pass through. The rigid plastic of clip 1, being softer that the stainless steel pin 13, returns to its original form maintaining a clearance fit with the remainder of pin 13 except for the oversized head 14. the oversized head 14 prevents any further longitudinal movement of the pin 13. The holes 11 and 12 of bracket 6 and a spring 17, all disposed between the arms 2 and 3, preferably provide a clearance fit for the pin 13 as well as the second head 15. The spring 17 is mounted in the clip assembly 10 in any of a number of methods known in the art. The spring 17 is preferably biased to urge the clip 1 toward the bracket 6 when the spring 17 is properly engaged.

What is claimed is:

1. A clip assesmbly comprising:
   a clip, having at least two resiliently expandable holes therein;
   a bracket, having at least two resiliently expandable holes for alignment with said holes in said clip;
   a spring for biasing said clip towards said bracket;
   a pin positioned through said holes for pivotally securing said bracket to said clip, said pin having a head that is passed through said holes, said head being intergrally connected to said pin and having a diameter that is greater than at least one of said holes for retaining the assembly, said pin having a second head integrally connected to said pin and having a diameter greater than the holes in the clip and bracket.

2. The clip assembly of claim 1, wherein said pin comprises two heads, both of the heads having diameters greater than one of said clip and bracket holes.

3. The clip assembly of claim 1, wherein said pin includes a tapered feature for pressing through said holes in said clip causing a momentary expansion of said hole, the hole thereafter returning to its former shape and size and leaving a clearance fit for the remainder of said pin.

4. The method of manufacturing a clip assembly, comprising the steps of:
   (a) providing a clip having at least two resiliently expandable holes therein;
   (b) providing a bracket having at least two resiliently expandable holes therein;
   (c) providing a pin having a shank diameter allowing a clearance fit with said holes in said clip and bracket and further having a first head being integrally connected to said pin with a diameter larger than said holes in said clip and bracket and having a second head with a tapering feature, said second head being integrally connected to said pin;
   (d) pressing said pin through said holes in said clip, causing a mementary expansion of said holes, thereby pivotally engaging and laterally securing said clip to said bracket upon contraction of said holes while said main body of said pin remains in a clearance fit with both pairs of said holes.

5. The method of manufacturing a clip assembly as recited in claim 4, further comprising the step of:
providing said pin having a shank diameter allowing a clearance fit with said holes in said clip and bracket and further having a first head with a diameter larger than said holes in said clip and bracket and having a second head with a tapering feature that has a larger diameter than said holes in said bracket and clip and a smaller diameter smaller that said holes in said bracket and clip.

6. The method of manufacturing a clip assembly as recited in claim 4, futher comprising the step of:
providing said pin having a shank diameter allowing a clearance fit with said holes in said clip and bracket and further having a first head with a diameter larger than said holes in said clip and bracket and having a second head with a tapering feature that has a larger and smaller diameter larger than said holes in said bracket and clip.

* * * * *